United States Patent
Ronnang et al.

(10) Patent No.: US 10,704,915 B2
(45) Date of Patent: Jul. 7, 2020

(54) METHOD AND SYSTEM FOR PROVIDING DRIVING SITUATION BASED INFOTAINMENT

(71) Applicant: VOLVO CAR CORPORATION, Gothenburg (SE)

(72) Inventors: Magnus Ronnang, Vastra Frolunda (SE); Staffan Davidsson, Vastra Frolunda (SE)

(73) Assignee: VOLVO CAR CORPORATION, Gothenburg (SE)

( * ) Notice: Subject to any disclaimer, the term of this patent is extended or adjusted under 35 U.S.C. 154(b) by 110 days.

(21) Appl. No.: 15/146,958

(22) Filed: May 5, 2016

(65) Prior Publication Data
US 2016/0327399 A1    Nov. 10, 2016

(30) Foreign Application Priority Data
May 7, 2015   (EP) .................................... 15166758

(51) Int. Cl.
G01C 21/26     (2006.01)
H04W 4/48      (2018.01)
B60K 35/00     (2006.01)

(52) U.S. Cl.
CPC .............. G01C 21/26 (2013.01); B60K 35/00 (2013.01); H04W 4/48 (2018.02)

(58) Field of Classification Search
None
See application file for complete search history.

(56) References Cited

U.S. PATENT DOCUMENTS

| | | | |
|---|---|---|---|
| 5,912,644 A | 6/1999 | Wang | |
| 6,553,310 B1 | 4/2003 | Lopke | |
| 8,909,476 B2 | 12/2014 | Tuukkanen | |
| 2002/0041692 A1 | 4/2002 | Seto et al. | |
| 2004/0003706 A1* | 1/2004 | Tagawa .................. | G01C 21/26 84/609 |

(Continued)

FOREIGN PATENT DOCUMENTS

| | | |
|---|---|---|
| CN | 101303878 A | 11/2008 |
| CN | 101493333 A | 7/2009 |

(Continued)

OTHER PUBLICATIONS

Extended European Search Report for European Application No. 15166758.1, Completed by the European Patent Office, dated Oct. 28, 2015, 9 Pages.

(Continued)

*Primary Examiner* — John Olszewski
*Assistant Examiner* — Gerrad A Foster
(74) *Attorney, Agent, or Firm* — Brooks Kushman P.C.

(57) ABSTRACT

A method performed by an infotainment providing system for providing driving situation based infotainment in a vehicle. The infotainment providing system determines a current position of the vehicle, determines from a digital map associated with the vehicle one or more road attributes of a current or subsequent road segment assumed or known to be ahead of the vehicle. The infotainment providing system selects, in consideration of the one or more road attributes, at least a first piece of media content from a media content source, and provides the at least first piece of media content in the vehicle.

16 Claims, 4 Drawing Sheets

(56) References Cited

U.S. PATENT DOCUMENTS

| | | | |
|---|---|---|---|
| 2005/0246091 A1* | 11/2005 | Kuroda | G01C 21/3697 701/532 |
| 2007/0112504 A1* | 5/2007 | Krause | G01C 21/3407 701/532 |
| 2008/0015771 A1 | 1/2008 | Breed et al. | |
| 2008/0156173 A1 | 7/2008 | Bauer | |
| 2008/0262725 A1 | 10/2008 | Whitaker et al. | |
| 2011/0040707 A1 | 2/2011 | Theisen et al. | |
| 2011/0098916 A1 | 4/2011 | Jang | |
| 2012/0123629 A1 | 5/2012 | Edwards et al. | |
| 2012/0130631 A1 | 5/2012 | Chen | |
| 2012/0150853 A1 | 6/2012 | Tang | |
| 2012/0265785 A1 | 10/2012 | Paik | |
| 2013/0038437 A1* | 2/2013 | Talati | B60K 35/00 340/438 |
| 2013/0253833 A1 | 9/2013 | Tuukkanen | |
| 2014/0074395 A1 | 3/2014 | Brown | |
| 2014/0201770 A1 | 7/2014 | Schraga | |
| 2014/0236462 A1 | 8/2014 | Healey et al. | |
| 2016/0047673 A1* | 2/2016 | Bottari | G01C 21/3629 701/540 |
| 2016/0203716 A1* | 7/2016 | Jeschke | B60W 40/072 701/532 |
| 2016/0298976 A1* | 10/2016 | Sato | G08G 1/096827 |
| 2017/0010125 A1* | 1/2017 | Adachi | G01C 21/3697 |
| 2017/0017851 A1* | 1/2017 | Matsui | G01C 21/36 |
| 2017/0369056 A1* | 12/2017 | Arai | G08G 1/01 |

FOREIGN PATENT DOCUMENTS

| | | |
|---|---|---|
| CN | 101992779 A | 3/2011 |
| CN | 104394472 A | 3/2015 |
| CN | 104504921 A | 4/2015 |
| DE | 10030819 | 1/2002 |
| EP | 1378912 A2 | 1/2004 |
| EP | 1378912 A3 | 10/2005 |
| TW | 201221914 A | 6/2012 |

OTHER PUBLICATIONS

Wu et al. IEEE Transactions of Intelligent Transportation Systems Sep. 1, 2008, vol. 9, No. 3, pp. 463-475, XP 011347130, "Development of an Adaptive Workload Management System Using the Queueing Network-Model Human Processor (QN-MHP)".

Anonymous: Standortbezogene Dienste—Wikipedia, Aug. 8, 2014, XP055587629, Retrieved from the Internet: <<https://de.wikipedia.org/w/index.php?title=Standortbezogene_Dienste&oldid=132896877>>, May 10, 2019.

The State Intellectual Property Office of the People's Republic of China, First Office Action for Chinese Patent Application No. 201610296643.4, dated Mar. 30, 2020, 18 Pages (including English translation).

* cited by examiner

METHOD AND SYSTEM FOR PROVIDING DRIVING SITUATION BASED INFOTAINMENT

CROSS-REFERENCE TO RELATED APPLICATIONS

This application claims foreign priority benefits under 35 U.S.C. § 119(a)-(d) to European patent application number EP 15166758.1, filed May 7, 2015, which is incorporated by reference in its entirety.

TECHNICAL FIELD

The present disclosure relates to an infotainment providing system and a method performed therein for providing driving situation based infotainment in a vehicle.

BACKGROUND

While driving, a vehicle driver commonly prefers, perhaps along with fellow vehicle occupants, to simultaneously be entertained, for instance audibly. The reasons for that may, for instance, relate to taking the opportunity to listening to music, a book or a podcast, keeping up to date with news updates, and/or being kept informed of the traffic situation, etc. As a beneficial side effect, listening to entertaining content may be mind-stimulating to the vehicle driver, thus assisting said driver in maintaining his or her attention to thereby drive more safely, and furthermore to enable said driver to, to greater extent, have a pleasant driving experience.

Entertaining content being consumed in the vehicle, regardless of the initiator thereof, is commonly provided irrespective of a driving situation of the vehicle, and without consideration of driving more safely. That is, the content is conventionally selected merely in view of its entertaining value, without taking into consideration other aspects. A scenario which is commonly considered inconvenient, however, arises when a vehicle occupant out driving reaches a final destination, and the piece of entertainment being consumed in the vehicle—commonly referred to as infotainment—has not yet come to an end. The vehicle occupant may then need to either interrupt consumption of the entertaining content, or stay in the vehicle until said content has been enjoyed in full.

In order to avoid said scenario, U.S. Pat. No. 8,909,476, for instance, discloses an approach for recommending a content item for consumption during travel based on a travel time associated with a travel route. A solution is suggested which generates recommendations—i.e. messages featuring individual content items or lists thereof—for selection by the user based on timing information. However, although taking into consideration a timing aspect of the entertainment being provided in view of the travel route destination, U.S. Pat. No. 8,909,476 does not provide a solution contributing to driving more safely; nor does U.S. Pat. No. 8,909,476 provide a solution for driving situation based infotainment in general.

SUMMARY

It is therefore an object of embodiments herein to provide driving situation based infotainment in a vehicle.

According to a first embodiment described herein, a method performed by an infotainment providing system for providing driving situation based infotainment in a vehicle is described. The infotainment providing system determines a current position of the vehicle. Moreover, the infotainment providing system determines from a digital map associated with the vehicle, one or more road attributes of a current or subsequent road segment assumed or known to be ahead of the vehicle. Furthermore, the infotainment providing system selects, in consideration of the one or more road attributes, at least a first piece of media content from a media content source. The infotainment providing system further provides the at least first piece of media content in the vehicle.

Thereby, an approach is provided which enables entertainment in the vehicle to be provided in consideration of a current or upcoming driving situation. Since the infotainment providing system determines one or more road attributes of a current or subsequent road segment assumed or known to be ahead of the vehicle and subsequently selects, in consideration of the one or more road attributes, at least a first piece of media content from a media content source, a media content item is derived in view of the road characteristics. Accordingly, a media content item may be chosen that is considered suitable in view of the prevailing, or upcoming, road segment. That is, depending on the one or more road attributes, a road segment may be considered to be demanding for a driver to a varying degree, i.e. considered to require driver alertness to a varying degree. Consequently, a media content item may be chosen that is considered suitable in view of the driver alertness considered required, for the prevailing or upcoming road segment. Accordingly, for a road segment which based on the one or more road attributes is deemed to be a road section indicating that a relatively high level of driver alertness may be required, media content such as e.g. rock music, and/or which is e.g. cognitively stimulating, may preferably be avoided in order not to distract—such as cognitively distract—and/or cognitively overload the driver. Vice versa, for a road segment which based on the one or more road attributes is deemed to be a road section indicating that a relatively low level of driver alertness may be required, media content such as e.g. rock music, and/or which is e.g. cognitively stimulating, may be preferred in order to stimulate the driver to stay—or become—alert, and/or to prevent the driver from becoming bored, in-alert, drowsy, fatigued, dozy, sleepy, and/or from falling asleep. Thus, since the infotainment providing system then provides the at least first piece of media content in the vehicle, driving situation based infotainment is made available. That is, by road characteristics of a current or subsequent road segment ahead of the vehicle being taken into account in the selection of one or more pieces of media content, the driving situation, in terms of road attributes, have effect on the infotainment being provided in the vehicle.

For that reason, there is provided driving situation based infotainment in a vehicle.

The technical features and corresponding advantages of the above mentioned method will be discussed in further detail in the following.

By introducing a method performed by an infotainment providing system for providing driving situation based infotainment in a vehicle, an approach is introduced which enables entertainment in the vehicle to be provided in consideration of a current or upcoming driving situation. "Vehicle" may refer to any arbitrary vehicle, and may for instance refer to an engine-propelled vehicle, such as car, truck, lorry, van, bus, motor cycle, scooter, tractor, military vehicle, vessel, boat etc., a rail-bound vehicle, such as e.g. a train or tram, or a bicycle. Moreover, the word "infotainment" may refer to, for instance, information-based and/or entertainment-based media content. Furthermore, the expression "driving situation based" infotainment, may refer to "road characteristics based" or "road attributes based" infotainment, or infotainment "in view of" or "in consideration of" a driving situation.

The infotainment providing system may, for instance, at least partly be comprised in the vehicle, such as in an in-vehicle system thereof. An "in-vehicle system", which may also be referred to as a "built-in vehicle system", "native in-vehicle control system" or "vehicle infotainment system", may refer to hardware/software products and systems which are permanently or temporarily built into, or can be added to the vehicle, in order to enhance the vehicle occupant experience when it comes to providing audio and visual entertainment, as well as automotive navigation systems. Accordingly, the in-vehicle system may comprise resources adapted for functionality control of the in-vehicle system, such as microphones, speakers, input/control devices such as physical push buttons, rocker buttons, dials, slider switches, sticks, and/or a touchpad. The in-vehicle system may further comprise one or several displays, such as touch sensitive displays, commonly utilized to display e.g. graphic, video, digital images, animations and text, and further utilized to display e.g. virtual buttons, menus, and other user-interface objects to thereby provide a user interface through which a vehicle occupant, for instance the driver, may interact with the in-vehicle system. Accordingly, one or more of the resources of the in-vehicle system, such as the microphone(s), loudspeaker(s), input/control devices and/or display(s), may be utilized to provide functionality of the infotainment providing system, and/or utilized to enable the vehicle occupant to interact therewith.

Additionally or alternatively, the infotainment providing system may, at least partly, be comprised in a user device, which user device is taken on-board the vehicle. The "user device" may in this context be a mobile user device, which mobile user device further may have navigating abilities. The "user device" may accordingly refer to, for instance, a multi-functional smart phone, mobile phone, mobile terminal or wireless terminal, portable computer such as a laptop, PDA or tablet computer, surf plate such as an iPad, Pocket PC, and/or mobile navigation device. The "user device" may comprise resources adapted for functionality control thereof, such as microphone(s), speaker(s), input/control devices such as physical push buttons, rocker buttons, dials, slider switches, sticks, and/or a touchpad. The "user device" may further comprise one or several displays, such as touch sensitive displays, commonly utilized to display e.g. graphic, video, digital images, animations and text, and further utilized to display e.g. virtual buttons, menus, and other user-interface objects to thereby provide a user interface through which a vehicle occupant, for instance the driver, may interact with the "user device". Accordingly, one or more of the resources of the "user device", such as the microphone(s), loudspeaker(s), input/control devices and/or display(s), may be utilized to provide functionality of the infotainment providing system, and/or utilized to enable the vehicle occupant to interact therewith.

Moreover, the "user device" may be adapted to communicate with the vehicle. The expression of the user device being adapted to "communicate with the vehicle", may refer to the user device being configured to be in communication with the vehicle, e.g. the in-vehicle system thereof, such that information and/or data may be transferred between the vehicle and the user device. Such communication may for instance be accomplished physically, such as via USB connection, and/or wirelessly, such as via Bluetooth, WiFi, or the like; additionally or alternatively, the connection may be accomplished via an intermediate system adapted to communicate with one or more vehicles, for instance a management and/or assisting system such as e.g. Volvo On Call, and/or via cloud functionality. Said expression may further refer to the user device being adapted to be "paired" and/or adapted to "be in connection" with the vehicle. The "user device" may in that context be referred to as a "nomadic device". Possibly, in order to be paired, identification of the nomadic device may be necessary, and/or authentication of the vehicle occupant, e.g. the driver. While the nomadic device is paired, the vehicle occupant may utilize functionality of the infotainment providing system in the nomadic device, e.g. via the in-vehicle system. Accordingly, previously discussed resources of the in-vehicle system may be utilized to provide functionality of the infotainment providing system, and/or utilized to enable the vehicle occupant to interact therewith.

Additionally or alternatively, the infotainment providing system may be distributed, such that at least a portion of the infotainment providing system may be arranged remotely from the vehicle, for instance in one or more databases, and/or servers, which for instance may support cloud functionality and/or crowd sourcing. Furthermore, the infotainment providing system may be adapted to have online abilities, for instance by supporting Wifi functionality, or by being adapted to be in radio communication with a radio communications network, such as cellular communications network, e.g. LTE, EDGE, CDMA, 4G, 3G, GPRS, or GSM, e.g. via the vehicle, such as via the in-vehicle system described above, and/or via the user device described above.

Moreover, the infotainment providing system, the vehicle and/or the user device discussed above may be adapted to receive and/or fetch data, such as local time, traffic and/or weather data, directly or indirectly supplied by, and/or collected from, e.g. fellow vehicles and/or fellow user devices associated therewith, thus supporting cloud functionality and/or crowd sourcing as commonly known in the art. Furthermore, the infotainment providing system, the vehicle and/or the user device discussed above may be adapted to determine a speed of the vehicle, and/or a geographical position of the vehicle—in any arbitrary known manner.

Since the infotainment providing system determines a current position of the vehicle, a location at which the vehicle is currently located is established. Determining the current vehicle position, e.g. the vehicle's GPS position, may take place periodically, essentially constantly and/or on request. Moreover, determining the current position of the vehicle may be achieved in any commonly known manner, and may for instance refer to GPS positioning, Wifi positioning and/or cellular positioning, e.g. accomplished by means of the infotainment providing system, the previously discussed in-vehicle system of the vehicle, a navigation system, and/or the previously discussed user device on-board the vehicle. The position of the vehicle may thus, according to some embodiments, be represented by the position of the user device. Additionally and/or alternatively, a stored vehicle position value may be fetched, e.g. from a remote database holding dynamic position values, such as the previously discussed intermediate system adapted to communicate with one or more vehicles and to hold updated positions of the vehicles. The expression "current position" may refer to "prevailing position", "position at a current or prevailing point of time", and/or "position at an essentially current or essentially prevailing point of time". Moreover, "current position" may likewise include "essentially current position". "Determining" a current position may refer to "deriving", "establishing", "receiving", "fetching", "requesting", "reading", "identifying", and/or "learning of" a current position.

Since the infotainment providing system determines from a digital map associated with the vehicle, one or more road attributes of a current or subsequent road segment assumed or known to be ahead of the vehicle, road characteristics which are associated with a prevailing or an upcoming road segment are derived from a digital map. That is, by accessing road attributes of said road segment from e.g. a digital map database, the infotainment providing system is made aware of road characteristics parameters describing the current or subsequent road segment assumed or known to be ahead of the vehicle. The road segment may be identified to be ahead of the vehicle in any arbitrary known manner, for instance by being a road section of a route guided by a navigation system, by being a road section further ahead up a road along which the vehicle is currently travelling, and/or by being a road section along which the vehicle is known, through learned behavior, to commonly travel, etc. Hence, the expression "current or subsequent road segment assumed or known to be ahead of the vehicle" may refer to any arbitrary prevailing or upcoming road section or stretch of road, of arbitrary length, along which the vehicle travels, or is, expected to travel. Moreover, the expression one or more "road attributes" may refer to one or more of, for instance, a road curve radius parameter, a road width parameter, a number of lanes parameter, an intersections parameter, a distance between intersections parameter, a number of roads in intersection parameter, a speed limit parameter, a road scenery parameter, a topography parameter, etc.

Furthermore, "determining" one or more road attributes may in this context refer to, for instance, "accessing", "establishing", "learning of", "becoming aware of", "identifying", "deriving", "retrieving", "receiving", and/or "requesting" one or more road attributes. Moreover, the expression of a digital map "associated with" the vehicle may refer to a digital map "comprised in", "accessible by" and/or "accessible from" the vehicle. Accordingly, the digital map may be comprised in one or more memories and/or databases, e.g. digital map databases, which may be comprised in said infotainment providing system, be locally arranged on-board the vehicle, and/or be comprised in the user device discussed above. Additionally or alternatively, the digital map may, at least partly, be remotely arranged, for instance comprised in one or more servers and/or databases located remotely from the vehicle, such as in the intermediate system discussed above. The digital map may furthermore be comprised in, or associated with, a navigation system associated with the vehicle, which e.g. may be represented by an in-vehicle navigation system and/or a navigation system comprised in the previously discussed user device.

Since the infotainment providing system selects, in consideration of the one or more road attributes, at least a first piece of media content from a media content source, one or more media content items are derived in view of the one or more road characteristics. Accordingly, the infotainment providing system supports driving situation based infotainment, in that road characteristics of a current or subsequent road segment ahead of the vehicle, are taken into account in the selection of one or more pieces of media content. Consequently, one or more media content items may be chosen that are considered suitable in view of said prevailing, or upcoming, road segment. That is, based on determination of the one or more road attributes, the current or subsequent road segment may be deemed, judged, established, determined, rated and/or categorized to be a type of road section considered to be driver intense to a certain level. That is, depending on the one or more road attributes, a road segment may be considered to be demanding for a driver to a varying degree, i.e. considered to require driver alertness to a varying degree. For instance, the infotainment providing system may, based on a road attribute of a first value, or a set of road attributes of a first set of values, determine a corresponding first road segment to be a road section of e.g. a first complexity category, e.g. indicating that a relatively high level of—and/or a high demand on—driver alertness may be required; correspondingly, based on a road attribute having a second value, or a set of road attributes having a second set of values, the infotainment providing system may determine a corresponding second road segment to be a road section of e.g. a second complexity category, e.g. indicating that a relatively low level of—and/or a low demand on—driver alertness may be required. Consequently, one or more media content items may be chosen that are considered suitable in view of the exemplifying established complexity category, i.e. in view of the level of driver alertness considered required, for the prevailing or upcoming road segment. Accordingly, for a road segment which based on the one or more road attributes is deemed to be a road section of e.g. a complexity category indicating that a relatively high level of driver alertness may be required, media content such as e.g. rock music, and/or media content which is e.g. cognitively stimulating, may preferably be avoided in order not to distract the driver. Vice versa, for a road segment which based on the one or more road attributes is deemed to be a road section of e.g. a complexity category indicating that a relatively low level of driver alertness may be required, media content such as e.g. rock music, and/or which is e.g. cognitively stimulating, may be preferred in order to stimulate the driver to stay alert, and/or to prevent the driver from becoming bored, in-alert, drowsy, fatigued, dozy, sleepy, and/or asleep. That is, the introduced inventive concept may assist in providing that the driver alertness may be kept on an essentially constant level, by cognitively stimulating the driver to an extent suitable in view of the road attributes.

Media content which is "cognitively stimulating" may refer to media content which is "mind-stimulating" and/or which "engages the driver in intellectual thinking or interaction". Moreover, "selecting" may refer to "deriving", "fetching", "downloading", and/or "receiving by streaming". Furthermore, the expression "piece of media content" may refer to for instance "content item", "media content item" and/or "media content element". "Media content" may in this context refer to any arbitrary content element—of any arbitrary file size—having infotainment value, and which may be retrievable from a media content source. Thus, the "media content" may refer to one or a combination of media content items from the non-exhaustive list of audio, video, and/or information clips, sessions or files, such as e.g. a music clip, a news clip, a text file, a podcast, a piece of advertisement, a quiz, or any arbitrary cognitively stimulating content, etc. Moreover, a media content item may be refined. Thus, e.g. a piece of text may be transformed to e.g. a piece of audio, in any manner known in the art, for instance by means of commonly known text-to speech, TTS. Moreover, "media content source" may refer to any one or more arbitrary commonly known locally and/or remotely arranged sources comprising media content, such as one or more storages, memories and/or databases holding and/or distributing pieces of media content. According to an example, the media content source may refer to a storage comprised in the in-vehicle system of the vehicle, or comprised in the user device, which media content source holds a plurality of audio based content.

According to another example, the media content source may for instance be represented by, or comprise, one or more online information sources, e.g. referring to one or more arbitrary, e.g. trusted, content providers providing online content. Such an online information source may for instance be represented by a publicly available online information source, e.g. a publicly available online content provider, providing media content such as encyclopaedic content, news content, music content and/or video content. Examples of a publicly available online information source may hence include one or more from the non-exhaustive list of commonly known "Wikipedia", "BBC News", "Spotify", "Echo Nest", "rdio", "Youtube", "Pandora", "WiMP" etc. Selecting media content, such as for instance music from a music online content provider, such as e.g. Spotify, or for instance news from a news online content provider, such as e.g. BBC News, may require the user, such as the vehicle occupant, the vehicle, an optional user device on-board the vehicle and/or the infotainment providing system, to be a subscriber thereto.

According to yet another example, additionally or alternatively, the media content source may be represented by, or comprise, one or more non-public online information sources, which may comprise one or more databases to which said vehicle, the infotainment providing system, a user device associated with the vehicle, and/or a vehicle occupant of the vehicle, is allowed at least partial access. Thereby, one or more, e.g. predetermined, non-public online information sources may represent the media content source, such as non-public content providers providing arbitrary user-restricted content. Such a non-public online information source may comprise, for instance, arbitrary content which may be of interest, for instance intended to be provided, to one or more vehicles, vehicle occupants, user devices associated with vehicles and/or infotainment providing systems. Said content, which for instance may relate to commercial offers and/or advertisement, may furthermore for instance be geo-tagged, i.e. associated with and/or labelled with e.g. geographical coordinates, whereby a specific piece of content hence may be applicable to a vehicle and/or occupant thereof passing by the location with which said specific content is associated. Said content may furthermore depend on vehicle status; that is, one piece of content, for instance a commercial offer, may be applicable to a vehicle determined to have a certain vehicle status, while another piece of content, for instance another commercial offer, may be applicable to a vehicle determined to have another certain status. The exemplifying non-public online information source may additionally or alternatively comprise, for instance, vehicle-related, traffic-related and/or infrastructure-related content, which may be geo-tagged, provided by e.g. a vehicle and/or a vehicle occupant, which content may be of interest to other vehicles and/or vehicle occupants, such as a geo-tagged traffic congestion experiences. Furthermore, said non-public online information source may additionally or alternatively comprise, for instance, arbitrary content, e.g. geo-tagged, sharable between different vehicles and/or vehicle occupants who may be members of a specific community of interest.

Selecting media content in a non-public online information source may require the user, e.g. the vehicle occupant, the vehicle, an optional user device associated with the vehicle, and/or the infotainment providing system, to be e.g. a member or a subscriber of said non-public online information source. Furthermore, the expression of being allowed "at least partial access" to the one or more databases may in this context refer to being allowed access to merely a fraction of the one or more databases or merely a fraction of the content of the one or more databases, to being allowed full access thereto. Moreover, the "one or more databases" may be arbitrarily located, for instance at different remote locations.

The expression of selecting at least a first piece of media content "in consideration of" the one or more road attributes, may refer to selecting at least a first piece of media content "considering", "in view of", taking into account", "utilizing", "based on", and/or "associated with" the one or more road attributes. According to an example, the expression "selecting, in consideration of said one or more road attributes, at least a first piece of media content from a media content source", may further comprise "selecting, in consideration of an outcome of a comparison of said one or more road attributes to road attributes criteria, at least a first piece of media content from a media content source". Thereby, by the one or more road attributes being compared to road attributes criteria, the current or subsequent road segment may be deemed, judged, established, determined, rated and/or categorized to be a type of road section considered to be driver intense to a certain level, and subsequently, the one or more media content items may be selected in consideration thereof. That is, depending on the outcome of the comparison of the one or more road attributes with the road attributes criteria, e.g. depending on whether the at least first road attribute exceeds or falls short of one or more preferences and/or thresholds of the road attributes criteria, the corresponding road segment may be considered to be demanding for a driver to a varying degree, i.e. considered to require driver alertness to a varying degree. "Road attribute criteria" may correspond to the one or more road attributes, and may thus refer to one or more of, for instance, a road curve radius preference, a road width preference, a number of lanes preference, a preference for intersections, a preference for distance between intersections, a preference for number of roads in intersection, a speed limit preference, a road scenery preference, a topography preference, etc.

For instance, the infotainment providing system may, based on comparing a road attribute of a first value or a set of road attributes of a first set of values, with a first road attribute criteria or a first set of road attributes criteria, determine a corresponding first road segment to be a road section of a first complexity category, e.g. indicating that a relatively high level of driver alertness may be required. That is, by comparing, for instance, an intersection parameter of the current or subsequent road segment with a preference for intersections comprised in the road attributes criteria, the infotainment providing system may determine that if there are more intersections along the road section than specified by the preference for intersections, the road segment falls into a complexity category indicating that a relatively high level of driver alertness may be required. Correspondingly, based on comparing a road attribute of a second value or a set of road attributes of a second set of values, with a second road attribute criteria or a second set of road attributes criteria, the infotainment providing system may determine a corresponding second road segment to be a road section of a second complexity category, e.g. indicating that a relatively low level of driver alertness may be required. That is, by comparing, for instance, a road width parameter of the current or subsequent road segment with a road width preference and/or threshold comprised in the road attributes criteria, the infotainment providing system may determine that if the road width of said road segment is greater than the road width preference, the road segment falls into a complexity category indicating that a relatively low level of driver alertness may be required, e.g. a complexity category indicating that the road segment is considered monotonous. Subsequently, one or more media content items may be selected that are considered suitable in view of the established complexity category for the prevailing or upcoming road segment.

Since the infotainment providing system then provides the at least first piece of media content in the vehicle, driving situation based infotainment is made available. That is, by road characteristics of a current or subsequent road segment ahead of the vehicle being taken into account in the selection of one or more pieces of media content, the driving situation, in terms of road attributes, thus have effect on the content of the infotainment being provided in the vehicle. "Providing" the at least first piece of media content may, for instance, refer to "presenting", "playing", "making available", "supplying", "recommending" and/or "suggesting" the at least first piece of media content.

According to an embodiment, the infotainment providing system may further determine that one or more road attributes of a subsequent road segment differ(s) from one or more road attributes of a current road segment along which the vehicle is positioned. The infotainment providing system then estimates a remaining time for the vehicle to reach the subsequent road segment. Moreover, selection by the infotainment providing system then comprises that the infotainment providing system selects at least a first piece of media content having a duration time shorter than or equal to the remaining time.

Thereby, by the infotainment providing system determining that one or more road attributes of a subsequent road segment differ(s) from one or more road attributes of a current road segment along which the vehicle is positioned, it is established that an upcoming road segment has one or more road characteristics differing from one or more road characteristics of a prevailing road segment. Accordingly, the subsequent road segment may be deemed, judged, established, determined, rated and/or categorized to be a type of road section considered to be driver intense to a certain level, which may differ from a level associated with the current road segment. That is, depending on the one or more road attributes of the upcoming road segment, said road segment may be considered to be demanding for a driver to a degree which differs from that of the prevailing road segment, e.g. a complexity category of the subsequent road segment may differ from a complexity category of the current road segment.

Moreover, by the infotainment providing system then estimating a remaining time for the vehicle to reach the subsequent road segment, a time window is established at the end of which the vehicle is deemed to arrive at the upcoming road segment. Estimated time of arrival at the subsequent road segment may be estimated in any arbitrary known manner, e.g. based on the current position of the vehicle, speed of the vehicle, speed limits e.g. derived from the digital map or a camera, and/or local time data, weather data and/or traffic data derived from fellow vehicles e.g. indicating traffic congestions, etc. According to an example, "estimating a remaining time for the vehicle to reach the subsequent road segment" may comprise "estimating a remaining time for the vehicle to reach the subsequent road segment, based on the current vehicle position and/or one or more updated vehicle positions; a current vehicle speed value and/or one or more updated vehicle speed values; a current speed limit value and/or one or more updated speed limit values, local time, traffic and/or weather data; and/or an estimated remaining distance to the subsequent road segment from the current vehicle position and/or from one or more updated vehicle positions". Estimation of the remaining time to reach the subsequent road segment may be continuously and/or intermittently repeated, whereby the remaining time accordingly may change. The expression "reach" the subsequent road segment may comprise "essentially reach" the subsequent road segment, and/or to "reach a beginning of" the subsequent road segment. The remaining time may be arbitrary, and may range e.g. from a few seconds to several hours.

Moreover, by the infotainment providing system then selecting at least a first piece of media content having a duration time shorter than or equal to the remaining time, a media content item is chosen which is estimated to have finished within the time window estimated to reach the subsequent road segment. Thereby, when reaching the upcoming road segment which is deemed to be demanding for a driver to a degree which differs from that of the prevailing road segment, the at least first piece of media content is estimated to have come to an end. Accordingly, it is provided that a piece of media content which may be considered suitable while driving along the current road segment but not while driving along the subsequent road segment, is estimated to have come to an end prior to, or upon, reaching the subsequent road segment. Consequently, it is introduced that the at least first piece of media content is no longer provided as the vehicle reaches the subsequent road segment, thus, the at least first piece of media content does no longer affect the driver while he or she is driving along the subsequent road segment. Accordingly, it is provided that a piece of media content being represented by e.g. rock music, and/or which is cognitively stimulating, has accordingly come to an end prior to, or upon, the vehicle reaching the subsequent road segment along which said media content may be deemed e.g. too distracting. Vice versa, it is provided that a piece of media content being represented by e.g. soft music, and/or which is not cognitively stimulating, has accordingly come to an end prior to, or upon, the vehicle reaching the subsequent road segment along which said media content may be deemed less mind-stimulating than preferred. "Shorter than" may likewise comprise "essentially shorter than", while "equal to" correspondingly likewise may comprise "essentially equal to". "Reach" may refer to "arrive at", while "differ" may refer to "deviate" and/or "are different". Moreover, "estimating" a remaining time may refer to "calculating", "deriving", "determining" and/or "detecting" a remaining time. It should furthermore be noted that, according to this embodiment, selecting the at least first piece of media content "in consideration of the one or more road attributes", may refer to: selecting the at least first piece of media content "in consideration of the one or more road attributes of the subsequent road segment".

According to another embodiment, selection by the infotainment providing system may further comprise that the infotainment providing system selects at least a first piece of media content associated with the one or more road attributes. Provision by the infotainment providing system then comprises that the infotainment providing system provides the at least first piece of media content in the vehicle, while the vehicle is positioned along the road segment.

Thereby, by the infotainment providing system selecting at least a first piece of media content associated with the one or more road attributes, one or more media content items which are associated with the one or more road attributes, are chosen. The expression of the at least first piece of media content being "associated with" the one or more road attributes, may in this context refer to the at least first piece of media content being "tagged with", "attributed with", "labelled with", "linked with", "referenced to", "categorized with" and/or "stored in association with" one or more variables, properties and/or parameters matching, or at least partly matching, the content of the one or more road attributes, a determined complexity category of said road segment, and/or an outcome resulting from a comparison of the one or more road attributes with road attributes criteria. Furthermore, the media content source may be adapted to support the at least first piece of media content being "associated with" the one or more road attributes.

Moreover, since the infotainment providing system then provides the at least first piece of media content in the vehicle while the vehicle is positioned along the road segment, one or more media content items considered suitable for said road segment are available in the vehicle while the vehicle is positioned along the road segment. Accordingly, the selection and subsequently provision of media content is adapted to suit the road segment along which the vehicle is positioned. The road segment may be a current and/or a subsequent road segment. Moreover, "while" may refer to "as long as", "when" and/or "only when", and further, "while" may likewise include "essentially while". Positioned "along" may refer to positioned "close to", "in the vicinity of", and/or "nearby", and further, "positioned along" may refer to "essentially positioned along".

According to yet another embodiment, the infotainment providing system may add the at least first piece of media content to an infotainment media playlist comprised in the infotainment providing system, which infotainment media playlist is accessible by an occupant of the vehicle. Thereby, a playlist is created, which playlist is administrable by a vehicle occupant, e.g. the driver of the vehicle. The word "adding" may in this context refer to, for instance, "storing", "streaming", and/or "downloading", whereas "accessible" for instance may refer to "administrable" and/or "changeable".

Titles of the one more pieces of media content in the infotainment media playlist, which titles may be named arbitrarily although preferably reflecting the respective media content with which they are associated, may be presented to the vehicle occupant, in order to inform him or her of contents of the playlist. Said titles may be presented via a playlist presentation medium associated with the vehicle, e.g. comprised in the previously discussed in-vehicle system, and/or comprised in the previously discussed user device on-board the vehicle. That is, the titles of the one or more pieces of media content of the infotainment media playlist may be presented by means of the previously discussed resources of the in-vehicle system and/or by means of the previously discussed resources the user device on-board the vehicle. According to one example, one or more displays are utilized to visually display the titles and/or images of the media content items of the infotainment media playlist. According to another example, one or more loudspeakers are utilized to audibly present the titles of the media content items of the infotainment media playlist. According to yet another example, both displays and loudspeakers are utilized.

Moreover, the infotainment media playlist may be accessible, for instance, via one or more user interfaces. Accordingly, a vehicle occupant may administer the one or more pieces of media content comprised in the infotainment media playlist, for instance, via the previously discussed resources of the in-vehicle system and/or via the previously discussed resources the user device on-board the vehicle. The vehicle occupant may hence, for instance, delete a media content item in the infotainment media playlist, by administrating, e.g. deleting, the presented title of the media content item of the list, to thereby adapt the content of the infotainment media list, to his or her liking. Upon deletion of a media content item, the infotainment providing system may select, in consideration of the one or more road attributes, at least a second piece of media content from the media content source, and provide the at least second piece of media content in the vehicle, subsequently adding the at least second piece of media content to the infotainment media playlist.

According to still another embodiment, the infotainment providing system presents at least a portion of content of the at least first piece of media content, via a media content presentation medium associated with the vehicle and/or associated with a user device on-board the vehicle. Thereby, content of the one or more media content elements may be presented to a vehicle occupant, for instance audibly and/or visually. The expression of "media content presentation medium associated with the vehicle and/or associated with a user device on-board the vehicle" may refer to presentation means comprised in, for instance, the in-vehicle system and/or user device discussed above. That is, the at least a portion of content of the at least first piece of media content may, for instance, be presented by means of the previously discussed resources of the in-vehicle system and/or by the previously discussed resources of the user device on-board the vehicle. According to one example, one or more loudspeakers are utilized to audibly present said content. According to another example, one or more displays are utilized to visually display said content. According to yet another example, both displays and loudspeakers are utilized.

The word "presenting" may in this context refer to, for instance, "playing". Moreover, the expression presenting "at least a portion" of content of the at least first piece of media content, may in this context range from presenting merely a fraction of the first media content item, to presenting an entirety thereof. The presentation of the at least a portion of content of the at least first piece of media content may, according to some embodiments, be stopped, paused, fast-forwarded, re-winded, and/or deleted via a previously discussed user interface discussed above, for instance by the vehicle occupant.

According to one embodiment, the at least first piece of media content may comprise an audio clip comprising one or a combination of: music; news; advertisement; and/or information. Thereby, the one or more media content items may comprise infotainment media content of audio format. Accordingly, the infotainment providing system may appear to provide a radio channel, the content of which is adapted to road attributes of road segments along which the vehicle is positioned. Moreover, since the at least first piece of media content according to this embodiment is an audio clip, rather than e.g. a video clip or piece of displayed text, said audio clip may not in the same manner invite the e.g. vehicle driver to take his or her eyes off the road.

According to a second embodiment described herein, an infotainment providing system adapted for providing driving situation based infotainment in a vehicle is described.

The infotainment providing system comprises a position determining unit adapted for determining a current position of the vehicle. The infotainment providing system furthermore comprises a road segment determining unit adapted for determining from a digital map associated with the vehicle, one or more road attributes of a current or subsequent road segment assumed or known to be ahead of the vehicle. Moreover, the infotainment providing system comprises a selecting unit adapted for selecting, in consideration of the one or more road attributes, at least a first piece of media content from a media content source. The infotainment providing system further comprises a providing unit adapted for providing the at least first piece of media content in the vehicle.

According to an embodiment, the road segment determining system may further be adapted for determining that one or more road attributes of a subsequent road segment differ(s) from one or more road attributes of a current road segment along which the vehicle is positioned. The infotainment providing system then furthermore comprises an estimating unit adapted for estimating a remaining time for the vehicle to reach the subsequent road segment. Moreover, the selecting unit is then further adapted for selecting at least a first piece of media content having a duration time shorter than or equal to the remaining time.

According to another embodiment, the selecting unit may be adapted for selecting at least a first piece of media content associated with the one or more road attributes. The providing unit is then adapted for providing the at least first piece of media content in the vehicle, while the vehicle is positioned along the road segment.

According to yet another embodiment, the infotainment providing system may further comprise an adding unit adapted for adding the at least first piece of media content to an infotainment media playlist comprised in the infotainment providing system, which infotainment media playlist is accessible by an occupant of the vehicle.

According to still another embodiment, the infotainment providing system may further comprise a presenting unit adapted for presenting at least a portion of content of the at least first piece of media content, via a media content presentation medium associated with the vehicle and/or associated with a user device on-board the vehicle.

According to one embodiment, the at least first piece of media content comprises an audio clip comprising one or a combination of: music; news; advertisement; and/or information.

Similar advantages as those mentioned in the foregoing in relation to the first embodiment correspondingly apply to the second, which is why these advantages are not further discussed.

According to a third embodiment described herein, a vehicle is described comprising at least a portion of the infotainment providing system discussed above, i.e. comprising one or more of the position determining unit, the road segment determining unit, the selecting unit, the providing unit, the optional estimating unit, the optional adding unit and/or the optional presenting unit. Once more, similar advantages as those mentioned in the foregoing in relation to the first embodiment correspondingly apply to the third, which is why these advantages are not further discussed.

According to a fourth embodiment described herein, a user device is described comprising at least a portion of the infotainment providing system discussed above, i.e. comprising one or more of the position determining unit, the road segment determining unit, the selecting unit, the providing unit, the optional estimating unit, the optional adding unit and/or the optional presenting unit. Again, similar advantages as those mentioned in the foregoing in relation to the first embodiment correspondingly apply to the fourth, which is why these advantages are not further discussed.

According to a fifth embodiment described herein, a computer program product is described comprising a computer program containing computer executable instructions or computer program code means arranged to cause a computer or a processor to execute the steps of the infotainment providing system discussed above, stored on a computer-readable storage medium or a carrier wave. Yet again, similar advantages as those mentioned in the foregoing in relation to the first embodiment correspondingly apply to the fifth, which is why these advantages are not further discussed.

It should be appreciated that the introduced methods in the infotainment providing system may require the vehicle, the user device and/or the infotainment providing system, to be in a respective "ON" state.

BRIEF DESCRIPTION OF THE DRAWINGS

Various non-limiting embodiments, including particular features and advantages, will be readily understood from the following detailed description and the accompanying drawings, in which.

DETAILED DESCRIPTION

Figure 1:
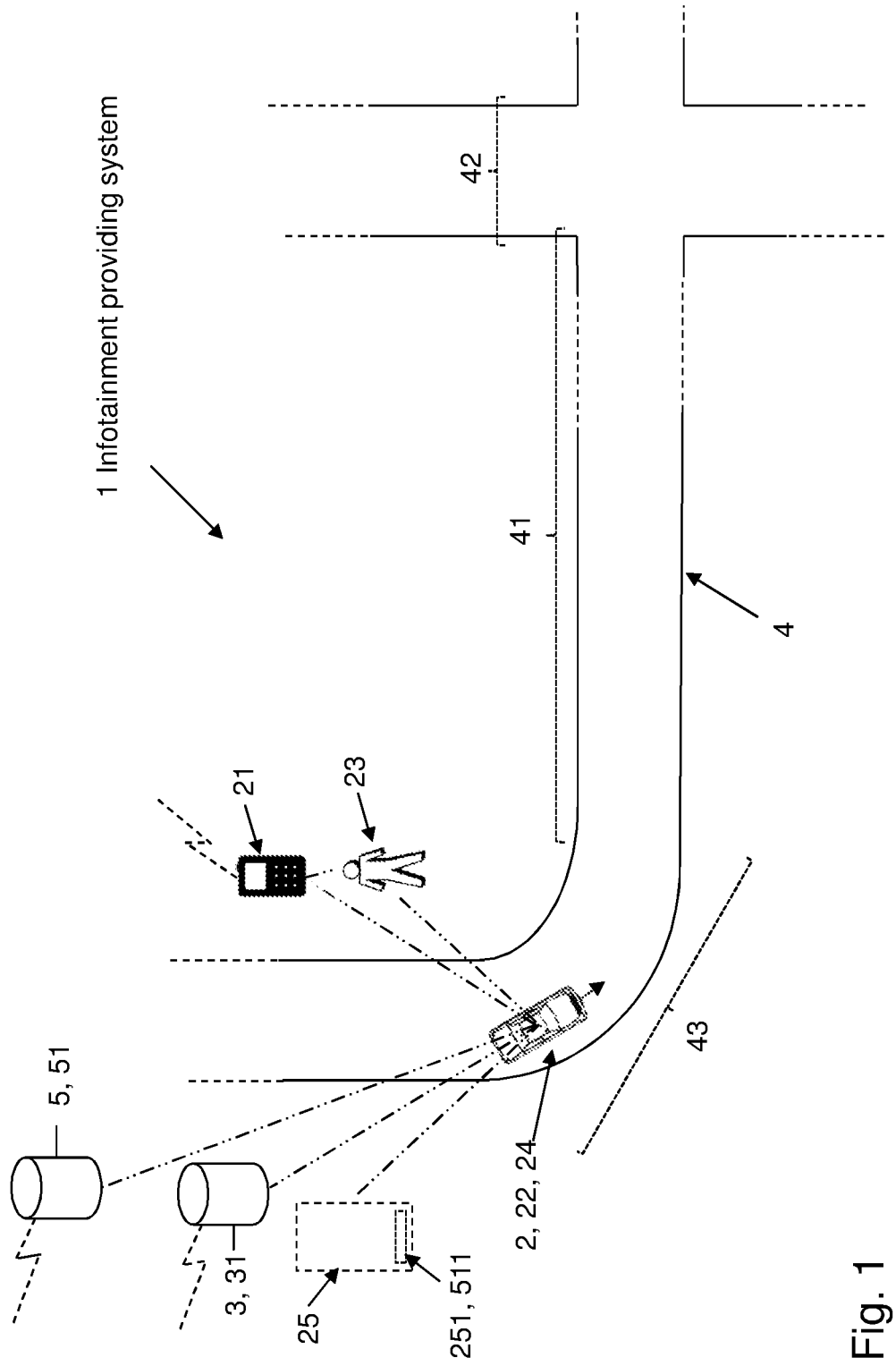
FIG. 1 illustrates a schematic overview of an exemplifying infotainment providing system comprised in a vehicle and/or in a user device, according to embodiments of the disclosure.

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The non-limiting embodiments of the present disclosure will now be described more fully hereinafter with reference to the accompanying drawings, in which embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to providing driving situation based infotainment, there will be disclosed that the driving situation, in terms of road attributes of a road segment, have effect on the infotainment being provided in the vehicle.

Referring now to the figures and FIG. 1 in particular, there is depicted a schematic overview of an exemplifying infotainment providing system 1 at least partly comprised in a vehicle 2 and/or in a user device 21, according to embodiments of the disclosure. The infotainment providing system 1, which will be described in further detail later on in this description, is adapted for providing driving situation based infotainment in the vehicle 2. The optional user device 21, which for instance may be represented by a smart phone, is here associated with the vehicle 2 by being paired therewith, whereby it may be referred to as a nomadic device.

Also depicted in the exemplifying embodiment of FIG. 1 is an optional commonly known map database 3. The map database 3 comprises a likewise commonly known digital map 31. The digital map 31 is associated with the vehicle 2; here, the map database 3 is comprised in a navigation system of the vehicle 2.

The illustrated vehicle 2 is in the shown embodiment a passenger car, comprising a vehicle occupant 23, driving along any suitable surface, such as an exemplifying arbitrary road 4, which may be represented by any surface along which the vehicle 2 may travel. The road 4 comprises—as specified by the digital map 31—a $1^{st}$ subsequent road segment 41 and a $2^{nd}$ subsequent road segment 42 assumed or known to be ahead of the vehicle 2. The vehicle 2 is in the example currently situated along a current road segment 43, at a determined current position 22.

Further depicted in the exemplifying embodiment, is a media content source 5, which here is represented by to a storage comprised in the in-vehicle system of the vehicle 2, or comprised in the user device 21, and which media content source 5 holds a plurality of audio based content. The infotainment providing system 1, the vehicle 2, the user device 21 and/or the vehicle occupant 23, has at least partial access to the media content source 5. The media content source 5 comprises at least a first piece of media content 51. Optionally, the at least first piece of media content 51 may comprise an audio clip comprising one or a combination of music, news, advertisement, and/or information.

Associated with said vehicle 2 and/or the user device 21 on-board the vehicle 2 is an optional media content presentation medium 24, which in the example is represented by one or more loudspeakers. The loudspeakers may be comprised in for instance the in-vehicle system of the vehicle 2; additionally or alternatively, the media content presentation medium 24 may be represented by one or more loudspeakers of the user device 21.

Moreover, optionally, associated with the vehicle 2 and/or the user device 21 on-board the vehicle 2 may be a playlist presentation medium 25. The playlist presentation medium 25 may be the same, or partially the same, as the media content presentation medium 24, i.e. at least a portion of the playlist presentation medium 25 may be represented by at least a portion of the media content presentation medium 24. According to the shown embodiment, however, the playlist presentation medium 25 may be represented by at least a first display 25 associated with the vehicle. 2. The optional display 25 is here represented by a display comprised in the in-vehicle system of the vehicle 2, for instance located in the instrument panel. Additionally or alternatively, the display 25 may be represented by a display of the user device 21. The display 25 is adapted to be accessible by the vehicle occupant 23, for instance the driver. The display 25 may for instance be represented by a touch display, thus providing a user-interface by means of which the vehicle occupant 23 may interact with the infotainment providing system 1. The playlist presentation medium 25 is adapted to provide, e.g. present and/or display, an optional infotainment media playlist 251 comprised in the infotainment providing system 1.

The infotainment media playlist 251 is adapted to be accessible by the vehicle occupant 23, and moreover adapted to provide the at least first piece of media content 51.

In the exemplifying embodiment of FIG. 1, an optional title 511 reflecting the media content item 51 with which it is associated is provided by means of the touch display 25. The touch display 25 here provides the vehicle occupant 23 the ability to administer the infotainment media playlist 251, by administering said title 511, e.g. deleting the title 511 and subsequently the corresponding media content item 51 from the infotainment media playlist 251. Additionally or alternatively, the infotainment media playlist 251 may be administered by means of for instance buttons or knobs, such as steering wheel control buttons, and/or by means of voice commands.

Figure 2:
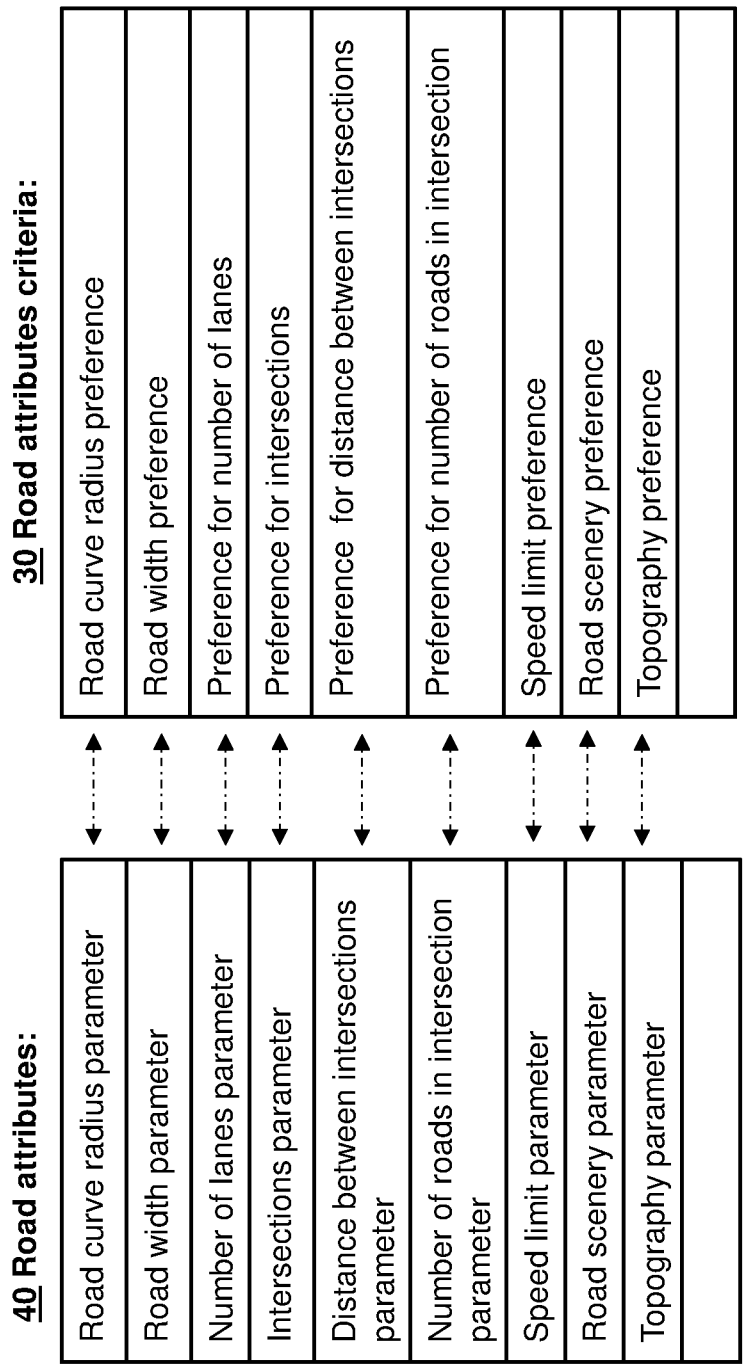
FIG. 2 illustrates exemplifying road attributes and exemplifying road attributes criteria, according to embodiments of the disclosure.

FIG. 2 illustrates exemplifying road attributes 40 as specified by the digital map 31, and exemplifying road attributes criteria 30 with which the road attributes 40 may be compared, according to embodiments of the disclosure. The road attributes 40 may here be represented by either of road characteristics of the $1^{st}$ subsequent road segment 41, road characteristics of the $2^{nd}$ subsequent road segment 42, or road characteristics of the current road segment 43.

The one or more road attributes 40 are here represented by the exemplifying non-exhaustive list of a road curve radius parameter, a road width parameter, a number of lanes parameter, an intersections parameter, a distance between intersections parameter, a number of roads in intersection parameter, a speed limit parameter, a road scenery parameter, and a topography parameter. Correspondingly, the one or more road attributes criteria 30 are here represented by the exemplifying non-exhaustive list of a road curve radius preference, a road width preference, a number of lanes preference, a preference for intersections, a preference for distance between intersections, a preference for number of roads in intersection, a speed limit preference, a road scenery preference, and a topography preference.

Figure 3:
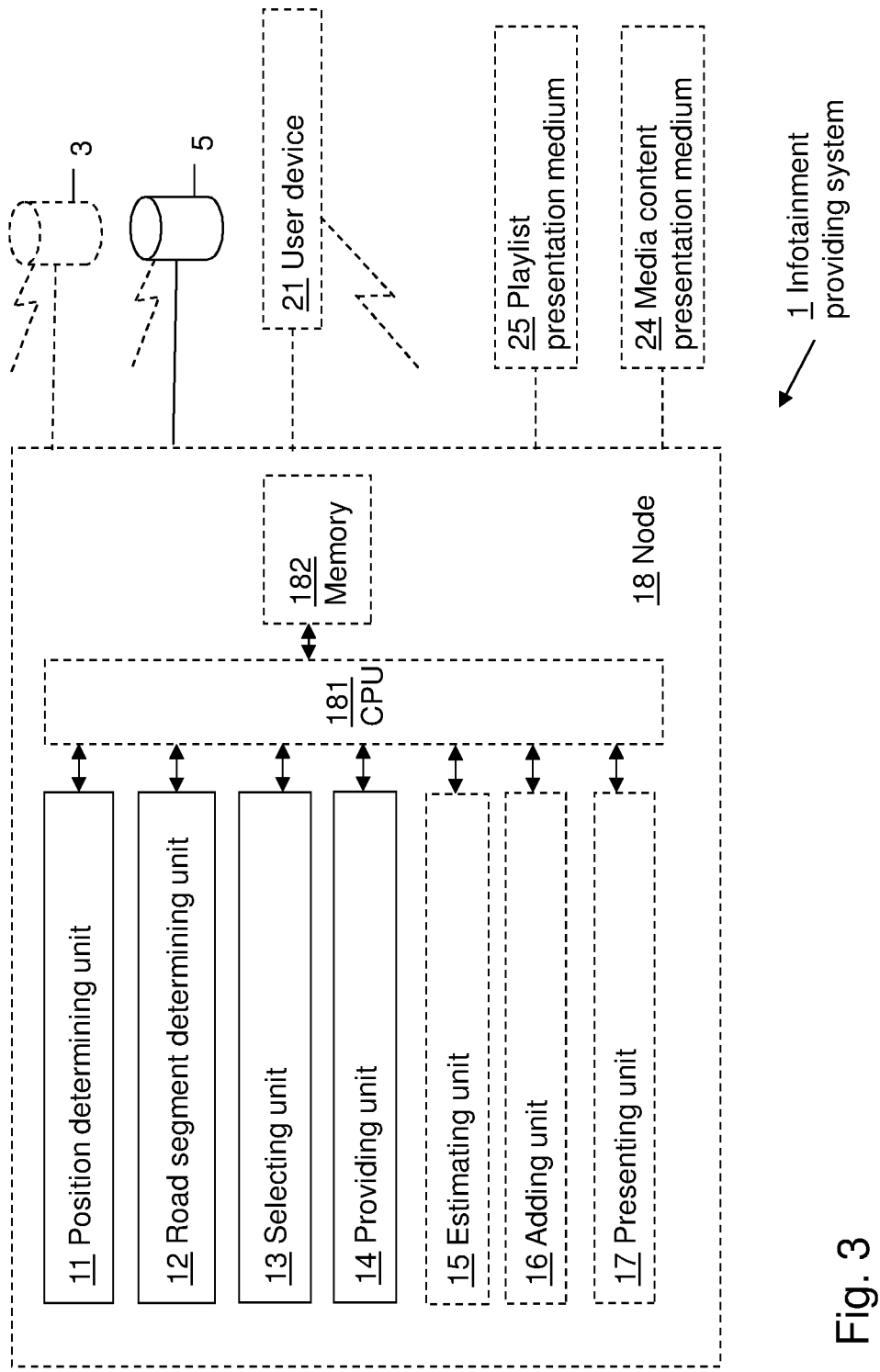
FIG. 3 is a schematic block diagram illustrating an exemplifying infotainment providing system according to embodiments of the disclosure.

As further shown in FIG. 3, which is a schematic block diagram illustrating an exemplifying infotainment providing system 1 according to embodiments of the disclosure, the infotainment providing system 1 is, as previously mentioned, adapted for providing driving situation based infotainment in a vehicle 2. The infotainment providing system 1 comprises a position determining unit 11, a road segment determining unit 12, a selecting unit 13, and a providing unit 14, all of which will be described in further detail below. Moreover, the infotainment providing system 1 may comprise an optional estimating unit 15, an optional adding unit 16, and/or an optional presenting unit 17, which in a similar manner will be described in further detail later on in this description.

Furthermore, the embodiments herein for providing driving situation based infotainment in the vehicle 2 may be implemented through one or more processors, such as a processor 181, here denoted CPU, together with computer program code for performing the functions and actions of the embodiments herein. Said program code may also be provided as a computer program product, for instance in the form of a data carrier carrying computer program code for performing the embodiments herein when being loaded into the infotainment providing system 1. One such carrier may be in the form of a CD ROM disc. It is however feasible with other data carriers such as a memory stick. The computer program code may furthermore be provided as pure program code on a server and downloaded to the infotainment providing system 1.

The infotainment providing system 1 may further comprise a memory 182 comprising one or more memory units. The memory 182 may be arranged to be used to store e.g. information, and further to store data, configurations, schedulings, and applications, and for instance the current vehicle position 22, the road attributes criteria 30, the infotainment media playlists 251, the media content 51, the media content titles 511 etc., to perform the methods herein when being executed in the infotainment providing system 1.

Furthermore, the position determining unit 11, the road segment determining unit 12, the selecting unit 13, the providing unit 14, the optional estimating unit 15, the optional adding unit 16, the optional presenting unit 17, the optional processor 181 and the optional memory 182 may for instance be implemented in one or several arbitrary nodes 18 arranged locally on-board the vehicle 2, implemented in the user device 21, and/or implemented remotely in one or more of a computer, database and/or server. The node 18 may be an electronic control unit (ECU) or any suitable generic electronic device, and may involve, for instance, an infotainment node, a navigation node and/or a main central node. The optional disposition of the functionality between the node(s) 18, the user device 21, and/or remote e.g. database, may be arbitrarily selected as considered suitable. According to an alternative example, the node(s) 18 may, rather than being represented by e.g. one or several integrated ECUs, be represented by a plug-in solution, for instance a dongle. In that manner, an aftermarket solution may be provided to any arbitrary vehicle suitable.

Those skilled in the art will also appreciate that the position determining unit 11, the road segment determining unit 12, the selecting unit 13, the providing unit 14, the optional estimating unit 15, the optional adding unit 16, and/or the optional presenting unit 17, may refer to a combination of analog and digital circuits, and/or one or more processors configured with software and/or firmware, e.g. stored in a memory such as the memory 182, that when executed by the one or more processors such as the processor 181 perform as will be described in more detail below. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Figure 4:
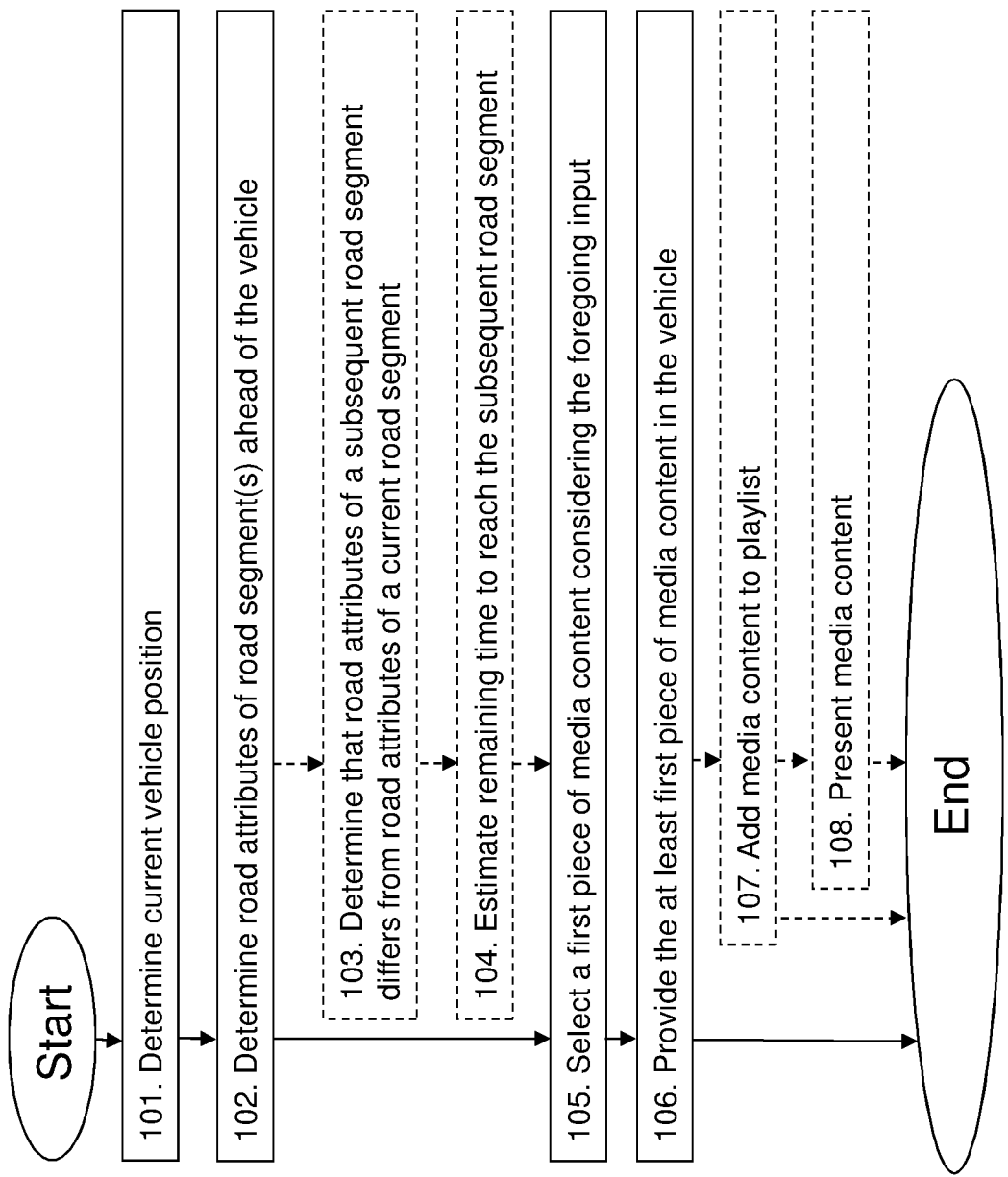
FIG. 4 is a flowchart depicting an exemplifying method performed by an infotainment providing system according to embodiments of the disclosure.

FIG. 4 is a flowchart depicting an exemplifying method performed by an infotainment providing system 1 according to embodiments of the disclosure. The method in the infotainment providing system 1 is for providing driving situation based infotainment in a vehicle 2. The exemplifying method, which may be continuously repeated, comprises the following actions discussed with support from FIGS. 1-3. The actions may be taken in any suitable order, and/or one or more actions may even be performed simultaneously where applicable.

Action 101

In Action 101, the infotainment providing system 1 determines, e.g. by means of the position determining unit 11, the current position 22 of the vehicle 2. Correspondingly, the position determining unit 11 is adapted for determining the current position 22 of the vehicle 2.

Action 102

In Action 102, the infotainment providing system 1 determines, e.g. by means of the road segment determining unit 12, from the digital map associated with the vehicle 2, one or more road attributes 40 of a current or subsequent road segment 41, 42, 43 assumed or known to be ahead of the vehicle 2. Correspondingly, the road segment determining unit 12 is adapted for determining from the digital map 31 associated with the vehicle 2, one or more road attributes 40 of a current or subsequent road segment 41, 42, 43 assumed or known to be ahead of the vehicle 2.

Thus, as shown with support from FIGS. 1 and 2, road characteristics 40 of the $1^{st}$ subsequent road segment 41, the $2^{nd}$ subsequent road segment 42, and/or of the current road segment 43, may be determined from the digital map 31. The respective one or more road attributes 40 of the $1^{st}$ subsequent road segment 41, the $2^{nd}$ subsequent road segment 42, and of the current road segment 43, reveal the complexity of the respective road segments 41, 42, 43, and subsequently, to what extent each respective road segment 41, 42, 43 may be demanding for a driver. As shown with support from FIGS. 1 and 2, the road attributes 40 of the first road segment 41 here indicate that the $1^{st}$ road segment 41 may require a relatively low level of driver alertness, in that the $1^{st}$ road segment 41 here is represented by a straight road section. Similarly, the road attributes 40 of the second road segment 42 indicate that the $2^{nd}$ road segment 42 may require a relatively high level of driver alertness, in that the exemplifying $2^{nd}$ road segment 42 here comprises an intersection.

In order to categorize the respective road segments 41, 42, 43, according to embodiments of the present disclosure and as shown in FIG. 2, the one or more road attributes 40 may be compared to corresponding one or more road attributes criteria 30. That is, depending on the outcome of the comparison of the one or more road attributes 40 with the road attributes criteria 30, e.g. depending on whether at least a first road attribute 40 exceeds or falls short of one or more preferences and/or thresholds of the road attributes criteria 30, the corresponding road segment 41, 42, 43 may be considered to be demanding for a driver to a varying degree, i.e. considered to require driver alertness to a varying degree. That is, by comparing, for instance, a road width parameter 40 of the current or subsequent road segment 41, 42, 43 with a road width preference and/or threshold comprised in the road attributes criteria 30, the infotainment providing system 1 may determine that if the road width 40 of said road segment 41, 42, 43 is greater than the road width preference 30, such as applicable for the $1^{st}$ subsequent road segment 41, the road segment 41 may fall into a complexity category indicating that a relatively low level of driver alertness may be required, e.g. a complexity category indicating that the road segment is considered monotonous.

Correspondingly, by comparing, for instance, an intersection parameter 40 of the current or subsequent road segment 41, 42, 43 with a preference for intersections comprised in the road attributes criteria 30, the infotainment providing system 1 may determine that if there are more intersections along the road section than specified by the preference for intersections, here zero, and such as applicable for the $2^{nd}$ subsequent road segment 42, the road segment 42 may fall into a complexity category indicating that a relatively high level of driver alertness may be required.

Action 103

In optional Action 103, the infotainment providing system 1 may determine, e.g. by means of the road segment determining unit 12, that one or more road attributes 40 of the subsequent road segment 41, 42 differ(s) from one or more road attributes 40 of the current road segment 43 along which the vehicle 2 is positioned. Correspondingly, the road segment determining unit 12 may further be adapted for determining that one or more road attributes 40 of the subsequent road segment 41, 42 differ(s) from one or more road attributes 40 of the current road segment 43 along which the vehicle 2 is positioned.

Thus, as shown with support from FIGS. 1 and 2, one or more of the road attributes 40—such as the intersections parameter and/or road curve radius parameter—of the $1^{st}$ subsequent road segment 41 in the illustrated example, differ from the corresponding road attributes 40 of the current road segment 43, as well as from the corresponding road attributes 40 of the $2^{nd}$ subsequent road segment 42. Similarly, one or more of the road attributes 40—such as the intersections parameter and/or road curve radius parameter—of the $2^{nd}$ subsequent road segment 42, differ from the road attributes 40 of the current road segment 43.

Action 104

Following upon optional Action 103, in optional Action 104, the infotainment providing system 1 may estimate, e.g. by means of the estimating unit 15, a remaining time for the vehicle 2 to reach the subsequent road segment 41, 42. Correspondingly, the estimating unit 15 may be adapted for estimating a remaining time for the vehicle 2 to reach the subsequent road segment 41, 42.

Thus, as shown with support from FIG. 1, the infotainment providing unit 1 may determine a remaining time to reach the $1^{st}$ road segment 41, e.g. the beginning thereof, or a remaining time to reach the $2^{nd}$ road segment 42, e.g. the beginning thereof, initially from the current vehicle position 22.

Action 105

In Action 105, the infotainment providing system 1 selects, e.g. by means of the selecting unit 13, in consideration of the one or more road attributes 40, the at least first piece of media content 51 from the media content source 5. Correspondingly, the selecting unit 13 is adapted for selecting, in consideration of the one or more road attributes 40, the at least first piece of media content 51 from the media content source 5.

Thus, as shown with support from FIGS. 1 and 2, a media content item 51 is derived from the media content source 5 taking into account the one or more road attributes 40 of either the current road segment 43, the $1^{st}$ subsequent road segment 41, and/or the $2^{nd}$ subsequent road segment 42. That is, a media content item 51 is selected which is considered suitable in view of the level of driver alertness considered required for the prevailing or upcoming road segment 41, 42, 43.

Accordingly, in consideration of the $1^{st}$ subsequent road segment 41, which here is represented by a road section which may require a relatively low level of driver alertness, a media content item 51 such as e.g. rock music, and/or which is e.g. cognitively stimulating, may be selected in order to stimulate the driver to stay—or become—alert. Correspondingly, in consideration of the $2^{nd}$ subsequent road segment 42, which here is represented by a road section which may require a relatively high level of driver alertness, a media content item 51 such as e.g. rock music, and/or which is e.g. cognitively stimulating, is preferably avoided, in favor of e.g. a media content item 51 being represented by e.g. soft music.

Should Action 105 of selecting the at least first piece of media content 51 follow upon optional Action 103 of determining that the one or more road attributes 40 of the subsequent road segment 41, 42 differs from the one or more road attributes 40 of the current road segment 43, and upon optional Action 104 of estimating a remaining time for the vehicle 2 to reach the subsequent road segment 41, 42, then Action 105 may further comprise selecting at least a first piece of media content 51 having a duration time shorter than or equal to the remaining time. Correspondingly, should the road segment determining unit 12 be further adapted for determining that the one or more road attributes 40 of the subsequent road segment 41, 42 differ(s) from the one or more road attributes 40 of the current road segment 43, and furthermore, should the optional estimating unit 15 be adapted for estimating a remaining time for the vehicle 2 to reach the subsequent road segment 41, 42, then the selecting unit 13 may further be adapted for selecting at least a first piece of media content 51 having a duration time shorter than or equal to the remaining time.

Thus, as shown with support from FIG. 1, upon selecting a media content item 51 while being positioned at the current vehicle position 22, in consideration of the one or more road attributes 40 of the $1^{st}$ subsequent road segment 41, a media content item 51 may be selected which is estimated to have finished within the estimated time window to reach the $1^{st}$ subsequent road segment 41. Accordingly, it is provided that a piece of media content 51 which may be considered suitable while driving along the current road segment 43 but not while driving along the 1st subsequent road segment 41, such as a media content item 51 being represented by a soft music file, is estimated to have come to an end prior to, or upon, reaching the $1^{st}$ subsequent road segment 41, where said soft music may be less mind-stimulating than considered suitable.

Alternatively, Action 105 of selecting, in consideration of the one or more road attributes 40, at least a first piece of media content 51, may comprise selecting at least a first piece of media content 51 associated with the one or more road attributes 40. Correspondingly, the selecting unit 13 may be adapted for selecting at least a first piece of media content 51 associated with the one or more road attributes 40.

Thus, as shown with support from FIGS. 1 and 2, a media content item 51 is chosen which is associated with the one or more road attributes 40. That is, for the current road segment 43, a media content item 51 is selected which is associated with the one or more road attributes 40 of the current road segment 43, for the $1^{st}$ subsequent road segment 41, a media content item 51 is selected which is associated with the one or more road attributes 40 of the $1^{st}$ subsequent road segment 41, and for the $2^{nd}$ subsequent road segment 42, a media content item 51 is selected which is associated with the one or more road attributes 40 of the $2^{nd}$ subsequent road segment 42.

Action 106

In Action 106, the infotainment providing system 1 provides, e.g. by means of the providing unit 14, the at least first piece of media content 51 in the vehicle 2. Correspondingly, the providing unit 14, which may also comprise any known audio and/or video system or device, is adapted for providing the at least first piece of media content 51 in the vehicle 2.

Thus, as shown with support from FIG. 1, driving situation based infotainment is made available in the vehicle 2, in the form of the selected media content item 51.

Should Action 106 of providing the at least first piece of media content 51, follow upon the potential scenario of optional Action 105 that at least a first piece of media content 51 is selected which is associated with the one or more road attributes 40, then Action 106 may comprise providing the at least first piece of media content 51 in the vehicle 2 while the vehicle 2 is positioned along the road segment 41, 42, 43. Correspondingly, should the selecting unit 13 be adapted for selecting at least a first piece of media content 51 associated with the one or more road attributes 40, then the providing unit 14 may be adapted for providing the at least first piece of media content 51 in the vehicle 2 while the vehicle 2 is positioned along the road segment 41, 42, 43.

Thus, as shown with support from FIG. 1, the selection and subsequently provision of media content 51 is adapted to suit the road segment 41, 42, 43 along which the vehicle 2 is positioned. That is, a media content item 51 considered suitable for a road segment 41, 42, 43 is available in the vehicle 2 while the vehicle 2 is positioned along the corresponding road segment 41, 42, 43. For instance, a media content item 51—such as a news update clip—associated with the current road segment 43 is provided while the vehicle 2 is positioned along the current road segment 43, a media content item 51—such as a piece of rock music—associated with the $1^{st}$ subsequent road segment 41 is provided while the vehicle 2 is positioned along the $1^{st}$ subsequent road segment 41, and/or a media content item 51—such as a piece of soft music—associated with the $2^{nd}$ subsequent road segment 42 is provided while the vehicle 2 is positioned along the $2^{nd}$ subsequent road segment 43.

Action 107

In optional Action 107, the infotainment providing system 1 may add, e.g. by means of the adding unit 16, the at least first piece of media content 51 to the infotainment media playlist 251 comprised in the infotainment providing system 1, which infotainment media playlist 251 is accessible by the vehicle occupant 23. Correspondingly, the adding unit 16 may be adapted for adding the at least first piece of media content 51 to the infotainment media playlist 251 comprised in the infotainment providing system 1, which infotainment media playlist 251 is accessible by the vehicle occupant 23.

Thus, as shown with support from FIG. 1, an infotainment media playlist 251 is created, which playlist 251 is administrable by the vehicle occupant 23, e.g. the driver 23 of the vehicle 2.

Optionally, the Action 107 of adding the at least first piece of media content 51 to the infotainment media playlist 251, may comprise presenting the title 511 of the at least first piece of media content 51 of the infotainment media playlist 251, via the playlist presentation medium 25 associated with the vehicle 2 and/or associated with the user device 21 on-board the vehicle 2. Correspondingly, the adding unit 16 may be adapted for presenting the title 511 of the at least first piece of media content 51 of the infotainment media playlist 251, via the playlist presentation medium 25 associated with the vehicle 2 and/or associated with the user device 21 on-board the vehicle.

Action 108

In optional Action 108, the infotainment providing system 1 may present, e.g. by means of the presenting unit 17, at least a portion of content of the at least first piece of media content 51, via the media content presentation medium 24 associated with the vehicle 2 and/or associated with the user device 21 on-board the vehicle 2. Correspondingly, the presenting unit 17 may be adapted for presenting at least a portion of content of the at least first piece of media content 51, via the media content presentation medium 24 associated with the vehicle 2 and/or associated with the user device 21 on-board the vehicle 2. Thus, as shown with support from FIG. 1, content of the media content item 51 may be presented to the vehicle occupant 23, for instance audibly and/or visually.

Consequently, according to the introduced concept as described in the foregoing, an approach is provided which enables road characteristics 40 of a current or subsequent road segment 41, 42, 43 ahead of the vehicle 2 to be taken into account in the selection 105 of one or more pieces of media content 51, whereby the driving situation, in terms of the road attributes 40, affects the infotainment 51 being provided in the vehicle 2.

The person skilled in the art realizes that the present disclosure by no means is limited to the embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method performed by an infotainment providing system for providing driving situation based infotainment in a vehicle, the method comprising:

determining, via a determining unit, a current position of the vehicle based on input data;

determining from a digital map associated with the vehicle, one or more road attributes of a current road segment and one or more road attributes of a subsequent road segment assumed or known to be ahead of the vehicle, the one or more road attributes comprising at least one of a curve radius parameter, road width parameter, number of lanes parameter, number of roads in an intersection parameter;

determining that one or more road attributes of the subsequent road segment differ(s) from one or more road attributes of the current road segment along which the vehicle is positioned, based upon which the subsequent road segment is determined to require driver alertness at a level differing from that of the current road segment;

estimating a remaining time for the vehicle to reach the subsequent road segment;

selecting, in consideration of the differing driver alertness levels indicated by the one or more road attributes of the current and subsequent road segments, at least a first piece of infotainment media content from a media content source, the at least first piece of infotainment media content comprising entertainment media content, wherein the at least first piece of infotainment media content has a duration time shorter than or equal to the remaining time; and providing, via a providing unit, the at least first piece of infotainment media content in the vehicle.

2. The method according to claim 1 wherein the at least first piece of infotainment media content is associated with the one or more road attributes of the current road segment; and wherein providing comprises providing the at least first piece of infotainment media content in the vehicle while the vehicle is positioned along the current road segment.

3. The method according to claim 1 further comprising:
adding the at least first piece of infotainment media content to an infotainment media playlist comprised in the infotainment providing system, which infotainment media playlist is accessible by an occupant of the vehicle.

4. The method according to claim 1 further comprising:
presenting the at least first piece of infotainment media content, via a media content presentation medium associated with the vehicle or a user device on-board the vehicle.

5. The method according to claim 1 wherein the at least first piece of infotainment media content comprises an audio clip.

6. The method according to claim 1 wherein the at least a first piece of infotainment media content further comprises information media content.

7. An infotainment providing system adapted for providing driving situation based infotainment in a vehicle, the infotainment providing system comprising:
a position determining unit adapted for determining a current position of the vehicle;
a road segment determining unit adapted for determining from a digital map associated with the vehicle, one or more road attributes of a current road segment and one or more road attributes of a subsequent road segment assumed or known to be ahead of the vehicle, the one or more road attributes comprising at least one of a curve radius parameter, road width parameter, number of lanes parameter, number of roads in an intersection parameter, the road segment determining unit further adapted for determining that one or more road attributes of a subsequent road segment differ(s) from one or more road attributes of a current road segment along which the vehicle is positioned, based upon which the subsequent road segment is determined to require driver alertness at a level differing form that of the current road segment;
an estimating unit adapted for estimating a remaining time for the vehicle to reach the subsequent road segment;
a selecting unit adapted for selecting, in consideration of the differing driver alertness levels indicated by the one or more road attributes of the current and subsequent road segments, at least a first piece of infotainment media content from a media content source, the at least first piece of infotainment media content comprising entertainment media content, wherein the at least first piece of infotainment media content has a duration time shorter than or equal to the remaining time; and
a providing unit adapted for providing the at least first piece of infotainment media content in the vehicle.

8. The infotainment providing system according to claim 7 wherein the
at least first piece of infotainment media content is associated with the one or more road attributes of the current road segment; and
wherein the providing unit is adapted for providing the at least first piece of infotainment media content in the vehicle, while the vehicle is positioned along the current road segment.

9. The infotainment providing system according to claim 7 further comprising:
an adding unit adapted for adding the at least first piece of infotainment media content to an infotainment media playlist comprised in the infotainment providing system, which infotainment media playlist is accessible by an occupant of the vehicle.

10. The infotainment providing system according to claim 7 further comprising:
a presenting unit adapted for presenting the at least first piece of infotainment media content, via a media content presentation medium associated with the vehicle or a user device on-board the vehicle.

11. The infotainment providing system according to claim 7 wherein the at least first piece of infotainment media content comprises an audio clip.

12. The infotainment providing system according to claim 7 wherein the infotainment providing system is part of a vehicle.

13. The infotainment providing system according to claim 7 wherein the infotainment providing system is part of a user device.

14. The infotainment providing system according to claim 7 wherein the at least a first piece of infotainment media content further comprises information media content.

15. A non-transitory storage medium comprising computer executable instructions for use in an infotainment providing system for providing driving situation based infotainment in a vehicle, wherein when the instructions are executed the infotainment providing system is operable to:
determine a current position of the vehicle;
determine from a digital map associated with the vehicle, one or more road attributes of a current or subsequent road segment assumed or known to be ahead of the vehicle, the one or more road attributes comprising at least one of a curve radius parameter, road width parameter, number of lanes parameter, number of roads in an intersection parameter;
determine that one or more road attributes of a subsequent road segment differ(s) from one or more road attributes of a current road segment along which the vehicle is positioned, based upon which the subsequent road segment is determined to require driver alertness at a level differing from that of the current road segment;
estimate a remaining time for the vehicle to reach the subsequent road segment;
select, in consideration of the differing driver alertness levels indicated by the one or more road attributes of the current and subsequent road segments, at least a first piece of infotainment media content from a media content source, the at least first piece of infotainment media content comprising entertainment media content, wherein the at least first piece of infotainment media content has a duration time shorter than or equal to the remaining time; and provide the at least first piece of media content in the vehicle.

16. The non-transitory storage medium according to claim 15 wherein the at least a first piece of infotainment media content further comprises information media content.

* * * * *

UNITED STATES PATENT AND TRADEMARK OFFICE
CERTIFICATE OF CORRECTION

PATENT NO. : 10,704,915 B2
APPLICATION NO. : 15/146958
DATED : July 7, 2020
INVENTOR(S) : Magnus Ronnang et al.

It is certified that error appears in the above-identified patent and that said Letters Patent is hereby corrected as shown below:

In the Claims

Column 23, Line 37, Claim 7:
After "driver alertness at a level differing"
Delete "form" and
Insert -- from --.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*